United States Patent [19]

Dennis et al.

[11] 4,448,388

[45] May 15, 1984

[54] CANOPY ASSEMBLY

[75] Inventors: Warren E. Dennis, Pasadena; Eric D. Plambeck, South Pasadena, both of Calif.

[73] Assignee: Casablanca Fan Company, Inc., City of Industry, Calif.

[21] Appl. No.: 245,987

[22] Filed: Mar. 20, 1981

[51] Int. Cl.³ .............................................. F16M 13/00
[52] U.S. Cl. ..................................... 248/663; 248/324
[58] Field of Search ............... 248/323, 324, 342, 343, 248/344, 345, 663, 667, DIG. 6

[56] References Cited

U.S. PATENT DOCUMENTS

| | | | |
|---|---|---|---|
| 793,942 | 7/1905 | Leach | 248/667 |
| 1,270,296 | 6/1918 | Jeune | 248/345 |
| 1,370,892 | 3/1921 | Hufschmidt | 248/345 |
| 1,693,396 | 11/1928 | Littleton | 248/DIG. 6 |
| 2,867,404 | 1/1959 | Ramsing | 248/324 |
| 3,512,743 | 5/1970 | Lipscomb | 248/324 |
| 4,037,098 | 7/1977 | Kowalski | 248/323 X |
| 4,099,694 | 7/1978 | Horwitz | 248/339 |

FOREIGN PATENT DOCUMENTS 2337475 2/1975 Fed. Rep. of Germany ...... 248/345

Primary Examiner—William H. Schultz
Attorney, Agent, or Firm—Charles H. Schwartz; Ellsworth R. Roston

[57] ABSTRACT

A canopy assembly for supporting an overhead ceiling fan to hang from an electrical box mounted in a ceiling including, a canopy having an upper open portion, a lower open portion and an interconnecting side portion and with the upper open portion surrounding and enclosing the electrical box and with the lower open portion having a particular size and configuration, means coupled to the canopy for connecting the canopy to the electrical box, a ball member for coupling to the ceiling fan for supporting the ceiling fan and with the ball member having an outer configuration matching the configuration of the lower open portion and having a maximum size greater than the particular size of the lower open portion, and the ball member for insertion into the canopy and with the ball member captured and supported by the lower open portion for the canopy to have the ceiling fan supported below the canopy.

17 Claims, 7 Drawing Figures

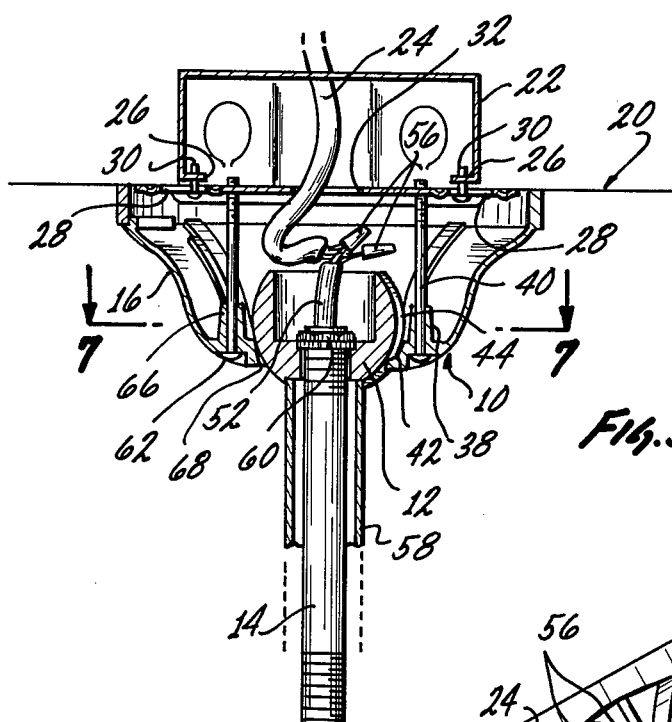
Fig.5
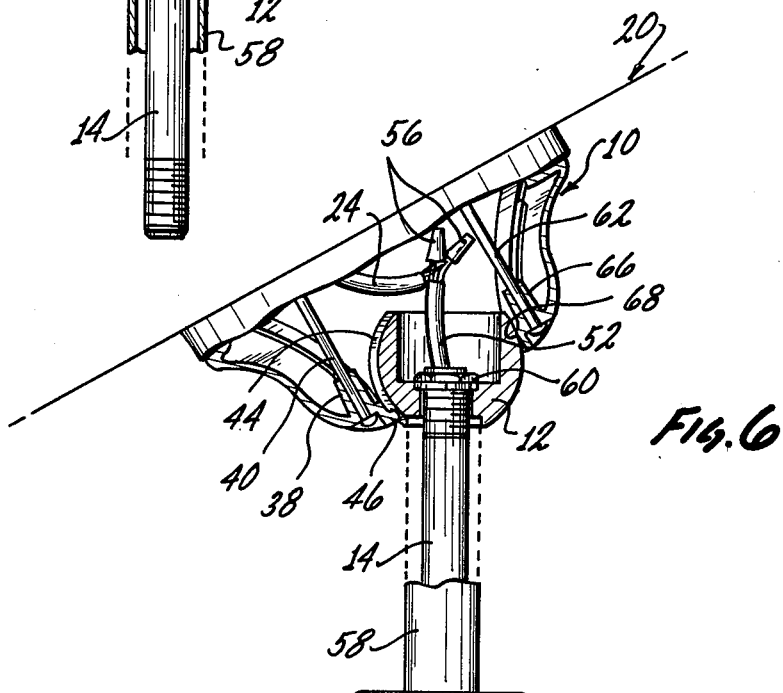
Fig.6
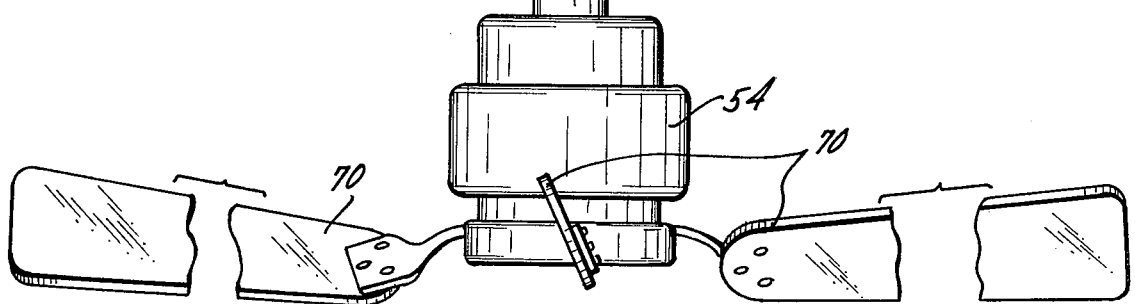

CANOPY ASSEMBLY

BACKGROUND OF THE INVENTION

1. Field of the Invention

The present invention is directed to a canopy assembly. In particular, the canopy assembly of the present invention is used to hang an overhead electrical fixture such as a ceiling fan.

2. Description of the Prior Art

Generally in the prior art, overhead electrical fixtures such as ceiling fans or lighting fixtures are supported by a chain link or a pin member connected to a hanger which is mounted onto an electrical housing box recessed into the ceiling. After the overhead fixture is hung and the electrical wiring connected then a canopy is slid upward to enclose the wiring and the mounting structure. The canopy may then be locked in position but the canopy does not provide for any support of the fixture and is merely used for cosmetic purposes.

In the prior art it is often difficult to hang the electrical fixture since one hand must be used to insert the pin or hook the chain link thereby leaving only one hand to support the fixure. Since the fixtures, such as the ceiling fans, can be quite heavy, the hanging of the ceiling fan can be difficult for one person. Moreover, when the prior art structures are used to hang ceiling fans the normal oscillations of the ceiling fan caused by slight imbalances are not damped. Since the fan is freely hung from the chain link or pin, the oscillations of the fan may create undesired noise and may even produce damage by the canopy rubbing against the ceiling as the fan swings.

SUMMARY OF THE INVENTION

The present invention provides for the hanging of an overhead electrical fixture, such as a ceiling fan, by the use of a ball joint, including a ball member, fitting within a circular opening in a canopy. The use of the ball joint allows the ceiling fixture to be hung from an overhead surface having a slope up to a 45° angle. The fan hangs down by gravity from the ball joint and therefore adjusts to any irregularity in the ceiling surface in any angular direction.

Because the ball joint is provided by a ball member within a circular opening in the canopy, the mounting of the present invention provides for a relatively high degree of friction between the ball member and the canopy opening. This friction makes the mounting of the present invention relatively immune to low velocity movements. The friction tends to increase the resonant frequency to which the fan will oscillate and thereby swing since the friction acts like a stiff spring member which increases the resonant frequency. Since the fan operates at a relatively low speed or frequency, any imbalance in the fan does not create a problem of swing since the speed or frequency of operation of the fan is lower than the now increased resonant frequency.

In a specific embodiment of the present invention, the canopy is constructed as a main canopy with an access opening and with the main canopy initially mounted flush to the ceiling using an intermediate mounting plate. Specifically, the mounting plate is mechanically attached to the recessed electrical box and with the main canopy then attached to the intermediate mounting plate. The electrical fixture, such as the ceiling fan, has a ball member mounted at the end of a mounting rod and the ball member is inserted through the access opening and seated in the circular opening at the bottom of the main canopy. The electrical connections between the wiring on the electrical box and the electrical fixture now may be made and with all the wiring located within the electrical box and canopy. As a final step a cover plate is attached to cover the access opening and provide a continuous external configuration for the entire canopy assembly.

The canopy assembly of the present invention is therefore very easy to use to support the electrical fixture since the main canopy portion initially is bolted to the mounting plate and fixed in position and then both hands can be used to support the fixture while inserting the ball joint through the access opening to be seated in the circular opening. Therefore, it is not necessary to support the fixture such as the ceiling fan with one hand while a chain link is hooked or a pin inserted with the other hand. The wiring connections are then completed through the access opening and the wiring is then placed within the canopy before the cover plate is locked in position.

BRIEF DESCRIPTION OF THE DRAWINGS

A clearer understanding of the present invention will be had with reference to the following description and drawings wherein:

FIG. 5 is a cross-sectional view of the canopy assembly of the present invention in the assembled state for supporting the fixture;

FIG. 6 is a cross-sectional view showing the canopy assembly mounted on a sloping surface for supporting the fixture.

DESCRIPTION OF THE PREFERRED EMBODIMENT

Figure 1:
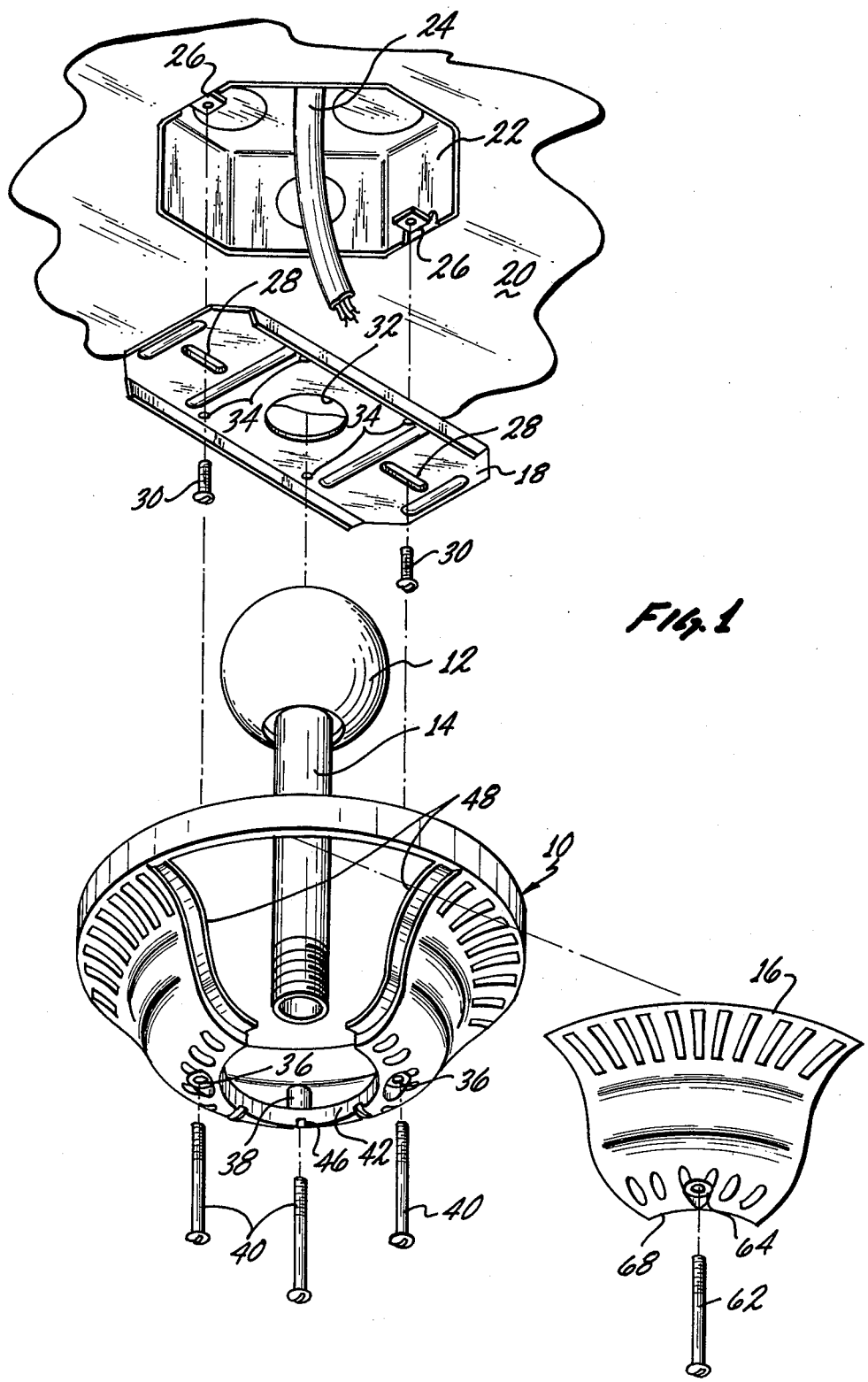
FIG. 1 is an exploded view of the canopy assembly of the present invention.

As can be seen in the various figures, the canopy assembly of the present invention includes a hollow main canopy 10, a substantially spherical ball member 12 mounted at the end of the tube 14, a pie shaped cover plate 16 and a mounting plate 18. The overhead surface or ceiling 20 from which the electrical fixture, such as a ceiling fan 54 (shown in FIG. 6), is to be hung generally includes a recessed electrical housing box 22 throughout which the electrical wiring 24 projects. The electrical box 22 normally includes flange portions 26 having threaded openings to be used for supporting an electrical fixture.

Figure 2:
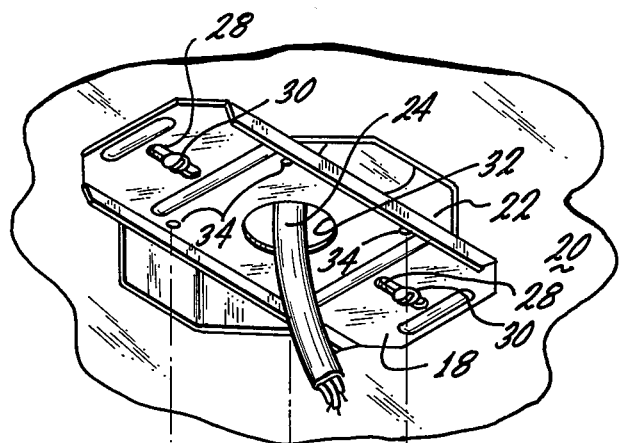
FIG. 2 is a perspective view showing the mounting plate in position and with the main canopy ready for attachment to the mounting plate.

The canopy assembly of the present invention could be directly coupled to the threaded openings in the flange portions 26, but in the particular embodiment disclosed in this application, the intermediate mounting plate 18 is used. Specifically, the mounting plate 18 includes elongated openings 28 through which bolt members 30 pass to be received within the threaded openings in the flange portions 26. As can be seen in FIG. 2, the intermediate mounting plate 18 is securely mechanically attached to the electrical box 22 and lies flush against the ceiling 20. The intermediate mounting plate also includes an opening 32 through which the electrical wires 24 may pass.

Once the intermediate mouting plate 18 is bolted in position, the main canopy 10 may now be mechanically attached to the plate 18 so as to have the main canopy lie against the ceiling 20. Specifically the mounting plate 18 includes a plurality of threaded openings 34 and the main canopy 10 includes openings 36, positioned complementary to the threaded openings 34. The openings 36 extend through post portions 38 which are integrally formed with the canopy. This may be clearly seen with reference to FIGS. 5 and 6.

Figure 4:
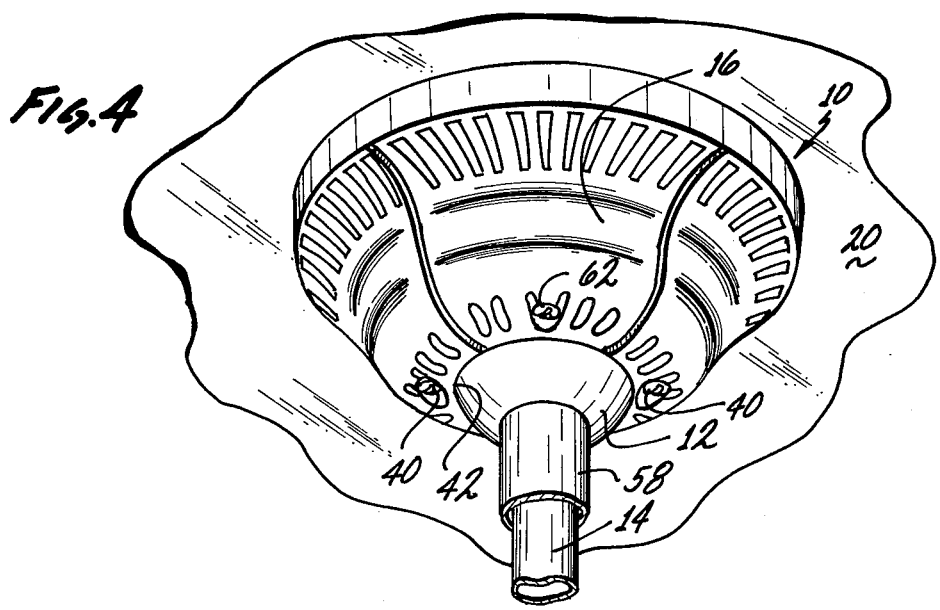
FIG. 4 is a perspective view of the canopy assembly of the present invention in the assembled state for supporting the fixture.

The openings 36 therefore are elongated by the post postions 38 to insure that bolt members 40 are guided to engage appropriate ones of threaded openings 34 in the intermediate mounting plate 18. The bolts 40 therefore securely bolt the main canopy 10 to lie flush against the ceiling 20. This can be clearly seen with reference to FIGS. 4, 5 and 6. As shown in FIG. 6, the main canopy 10 may be positioned against a sloping ceiling surface 20 and as will apparent later in this application, the use of the ball joint allows for the proper hanging of an electrical fixture even from a sloping surface.

Figure 7:
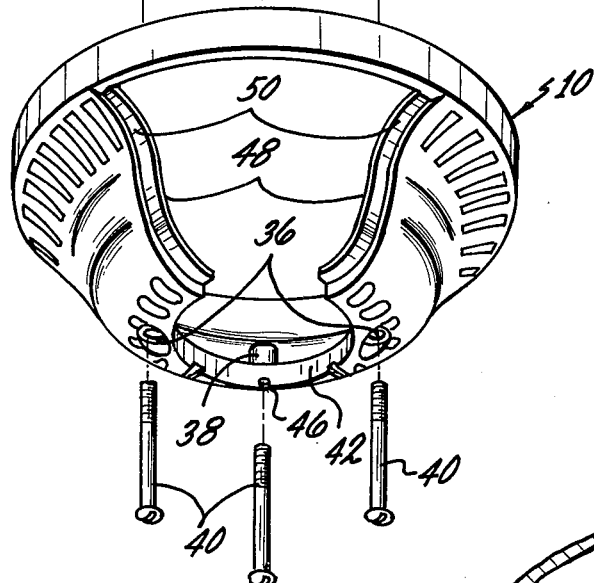
FIG. 7 is a top view of the canopy assembly taken along line 7—7 of FIG. 5.
Figure 7:
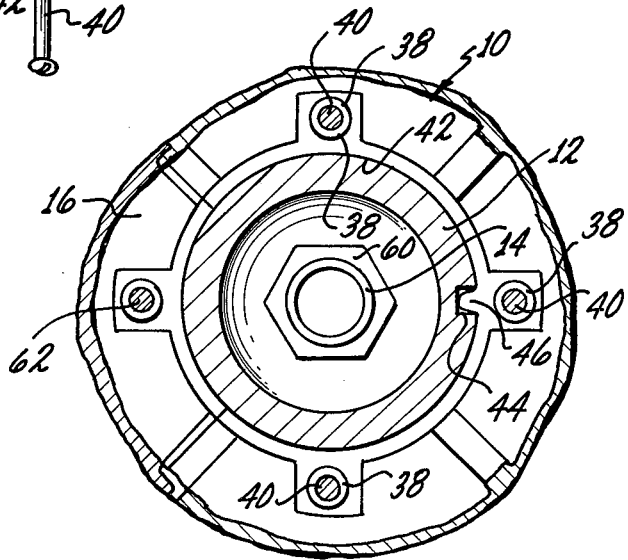

The main canopy 10 includes an upper open circular portion for lying against the ceiling 20 and enclosing the mounting plate 18 and the box 22. The main canopy also includes a lower portion formed as a circular opening 42 for use in capturing and supporting the ball member 12. The opening 42 is smaller in diameter than the ball member 12 and may be slightly chamfered upward as shown in FIGS. 5 and 6 so that the curved surface of the ball member 12 seats securely and contacts a portion of the opening 42 to increase the friction between the ball member the the opening 42. The ball member 12 includes an elongated groove 44 which extends along a generally vertical path and the opening 42 includes a complementary protrusion 46. When the ball member 12 is seated in the opening 42 and with a portion of the elongated groove 44 receiving the protrusion 46, the ball member 12 is prevented from rotation within the opening 42. This can be clearly seen with reference to FIG. 7. However, as shown in FIGS. 5 and 6 the ball member 12 may be positioned so as to pivot angularly in any direction within the opening 42 since the groove is elongated and the protrusion 46 engages along a small portion of the groove 44. As an example, the ball member may be seated within the opening 42 and with the main canopy 10 positioned on overhead surfaces having slopes as large as forty five degrees (45°).

The main canopy 10 includes a side portion interconnecting the upper and lower portions and with the side portion including a pie shaped access opening 48. The access opening 48 extends into the circular opening 42 so as to allow the ball member 12 to be inserted through the access opening to be seated within the circular opening 42. This can be seen with reference to FIG. 3. The main canopy 10 includes stepped flange portion 50 to support the cover plate 16 when the cover plate 16 is used to completely enclose the canopy assembly. It can also be seen that the external configuration of the cover plate 16 matches the external configuration of the main canopy 10 so that when the cover plate is in place, the external configuration of the canopy assembly has a unitary appearance.

Figure 3:
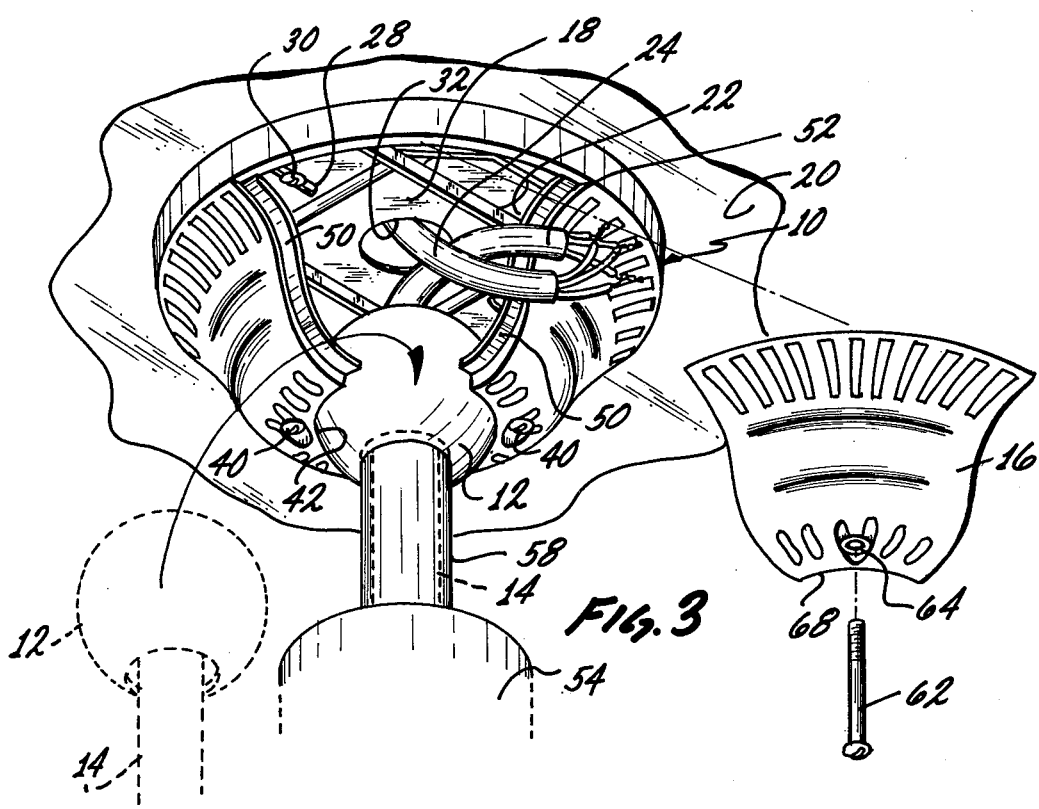
FIG. 3 is a perspective view illustrating the positioning of the ball joint prior to completing the wiring and fitting the cover plate.

In general as shown in FIG. 3, the ball member is inserted through the opening 48 and then brought downward to seat the ball member within the circular opening 42. Electrical wiring 52 would pass through the tube member 14 from the electrical fixture 54 which is shown in FIG. 6 to be a ceiling fan. The wiring 52 and the wiring 24 may be connected together using connectors 56 as shown in FIGS. 5 and 6 to provide for the proper electrical connections to the electrical fixture. The tube 14 is actually enclosed in an outer decorative tube 58 which exends between the electrical fixture 54 and a bottom recessed portion for the ball member 12. A pair of nut members 60 are used to lock all of the elements together as seen with reference to FIG. 6.

After the ball 12 is properly seated in the opening 42, the cover plate 16 is attached in position using a bolt member 62 passing through an opening 64 in the cover plate 16 and with the bolt member received within one of the threaded openings 34 in the intermediate mounting plate 18. The cover plate 16 may also include a post portion 66 as shown in FIGS. 5 and 6 so that the opening 64 is elongated to provide a guide for the bolt 62 to engage the threaded opening 34.

The cover plate 16 includes a bottom. curved portion 68 which is both curved and chamfered to match the circular opening 42. In this way the ball member 12 engages a continuous circular tapered surface to provide for a relatively high friction between the ball member and the full circular support surface. Because of gravity, the electrical fixture such as the ceiling fan 54, will hang vertically and automatically ccmpensate for any irregularity or slope of the ceiling surface.

Because of the high friction between the ball member and the circular opening in the canopy assembly, the ball joint of the present invention is relatively rigid to any low velocity movements of the ceiling fan. Since the ceiling fan 54 includes an electrical motor to provide for rotation of fan blades 70, any imbalance in the rotating elements could create a problem of the fan swinging during rotation. The prior art methods of mounting generally allowed for free oscillation at low frequencies so that the fan would swing and be noisy. With the present invention the large degree of friction between the ball and the circular opening in the canopy tends to act like a stiff spring so as to increase the frequency at which the mounting assembly can oscillate. Since the fan works at a relatively low frequency or speed, the increase in the permitted frequency of oscillation tends to dampen down any swinging of the fan.

Therefore the present invention provides for a canopy assembly which allows for a very easy hanging and wiring of an overhead electrical fixture, such as a ceiling fan, and which provides for a dampening of any oscillation which would normally be produced during the operation of the ceiling fan. Although the invention has been described with reference to a particular embodiment, it is to be appreciated that various adaptations and modifications may be made and the invention is only to be limited by the appended claims.

We claim:

1. A canopy assembly for hanging an overhead electrical fixture from an electrical housing box supported on an overhead surface, including:
   a main canopy having an upper portion, a lower portion and an interconnecting side portion, the upper portion adapted to surround and enclose the housing box and the lower portion including a symmetrical opening having a particular size and configuration and the side portion including an access opening extending into the symmetrical opening, first means included in the main canopy for providing for a mechanical attachment of the main canopy to the housing box, a ball member for coupling to the electrical fixture for supporting the electrical fixture, the ball member having an outer configuration matching the configuration of the symmetrical opening and having a size greater than the particular size of the symmetrical opening, the ball member being provided with dimensions for insertion through the access opening into the main canopy to be captured and supported by the symmetrical opening to have the electrical fixture hang below the main canopy, a cover plate having the same configuration as the access opening for covering the access opening after the ball member is inserted through the access opening, and second means included in the cover plate for providing for a mechanical attachment of the cover plate to the housing box.

2. The canopy assembly of claim 1 wherein the symmetrical opening in the lower portion of the main canopy has a circular configuration and the ball member has a substantially spherical configuration to allow the canopy assembly to adjust for different angular slopes for the overhead surface and the symmetrical opening is chamfered to increase the surface of contact with the ball member for an increase in resistance between the main canopy and the ball member.

3. The canopy assembly of claim 1 wherein the upper portion of the main canopy has a circular configuration of a first size and the lower portion of the main canopy has a circular configuration of a second size smaller than the first size and the access opening in the side portion is formed with a pie-shaped configuration extending the entire distance between the upper portion and the lower portion of the main canopy.

4. The canopy assembly of claim 1 wherein the ball member includes an elongated groove extending along a substantially vertical path and the symmetrical opening in the lower portion of the main canopy includes a small protrusion disposed at the bottom of the symmetrical opening and extending into and along a small portion of the groove to prevent rotational movement by the ball member within the symmetrical opening while allowing angular displacement by the ball member within the symmetrical opening.

5. The canopy assembly of claim 1 wherein the main canopy has a particular external configuration and the cover plate has a substantially similar external configuration to provide a uniform external appearance.

6. The canopy assembly of claim 1 wherein the first means for mechanically attaching the main canopy to the housing box includes an intermediate mounting plate and the mounting plate is adapted to be attached to the housing box and the main canopy is attached to the mounting plate.

7. The canopy assembly of claim 6 wherein the first means includes bolts which pass through openings in the main canopy and are received in threaded openings in the mounting plate and the openings in the main canopy are defined by post portions to guide the bolts to the threaded openings in the mounting plate.

8. The canopy assembly of claim 7 wherein the cover plate covers the access opening and the second means includes a bolt which passes through an opening in the cover plate and is received in a threaded opening in the mounting plate and the opening in the cover plate is defined by a post portion to guide the bolt to the threaded opening in the mounting plate.

9. A canopy assembly for supporting an overhead ceiling fan to hang from an electrical box mounted in a ceiling including, a canopy having an upper open portion, a lower open portion and an interconnecting side portion and the upper open portion adapted to surround and enclose the electrical box and the opening in the lower portion having a particular size and configuration, the opening in the lower portion having a chamfered surface, means coupled to the canopy for providing for a connection of the canopy to the electrical box, a ball member for coupling to the ceiling fan for supporting the ceiling fan, the ball member having an outer configuration matching the configuration of the lower open portion and having a size greater than the particular size of the lower open portion, the side portion including an access opening greater than the outer configuration of the ball member, the ball member being constructed for insertion into the canopy through the access opening in the side portion and for capture and support by the lower open portion of the canopy to have the ceiling fan supported below the canopy, the means for connecting the canopy to the electrical box including an intermediate mounting plate attached to the electrical box and the canopy including openings and means extending into the mounting plate through the openings in the canopy to secure the canopy to the mounting plate, and a cover plate covering the access opening in the interconnecting side portion of the canopy and wherein the cover plate includes an opening and means extend into the mounting plate through the opening in the cover plate to secure the cover plate to the mounting plate and wherein the cover plate has a configuration matching that of the canopy.

10. The canopy assembly of claim 9 wherein the lower open portion has a circular configuration and the ball member has a spherical configuration to allow the canopy assembly to adjust for different angular slopes of the ceiling.

11. The canopy assembly of claim 9 wherein the upper open portion of the canopy has a circular configuration of a first size and the lower open portion of the canopy has a circular configuration of a second size smaller than the first size and the interconnecting side portion includes the access opening extending into the lower open portion and the access opening is formed with a pie-shaped configuration extending from the top of the upper open portion to the bottom of the lower open portion of the canopy.

12. The canopy assembly of claim 11 wherein the canopy has a particular external configuration and additionally includes a cover plate for the access opening with a substantially similar external configuration to provide a uniform external appearance with the canopy.

13. The canopy assembly of claim 9 wherein the ball member includes an elongated groove extending along a substantially vertical path and the lower open portion includes a small protrusion disposed at the opening in the lower open portion and extending into and along a small portion of the groove to prevent rotational movement by the ball member within the lower open portion while providing for an angular displacement of the ball member within the lower open portion.

14. The canopy assembly of claim 9 wherein bolts pass through the openings in the canopy and are received in threaded openings in the mounting plate and the openings in the canopy are defined by post portions to guide the bolts to the threaded openings in the mounting plate.

15. The canopy assembly of claim 9 wherein the attaching means constitutes bolts passing through the openings in the canopy and received in threaded openings in the mounting plate and the openings in the canopy and cover plate are defined by post portions to guide the bolts to the threaded openings in the mounting plate and wherein the cover has a configuration matching that of the canopy.

16. The canopy assembly of claim 9 wherein the openings are in the lower open portion of the canopy.

17. The canopy assembly of claim 15 wherein the openings are in the lower portion of the canopy and the cover.

* * * * *